MEMORY ARRANGEMENT FOR ELECTRONIC DATA PROCESSING SYSTEM

Original Filed March 5, 1962

INVENTORS:
Leon Bloom
Morris Cohen
Sigmund N. Porter
By Louis A. Kline
John J. Maclage
Richard T. Rangel
Their Attorneys

MEMORY ARRANGEMENT FOR ELECTRONIC DATA PROCESSING SYSTEM

Original Filed March 5, 1962

INVENTORS
Leon Bloom
Morris Cohen
Sigmund N. Porter
By Louis A. Kline
John J. Maclago
Richard T. Regel
their Attorneys

MEMORY ARRANGEMENT FOR ELECTRONIC DATA PROCESSING SYSTEM

Original Filed March 5, 1962

INVENTORS:
Leon Bloom
Morris Cohen
Sigmund N. Porter
Louis A. Kline
By John J. Maclago
Richard T. Rempel
Their Attorneys MEMORY ARRANGEMENT FOR ELECTRONIC DATA PROCESSING SYSTEM
Original Filed March 5, 1962
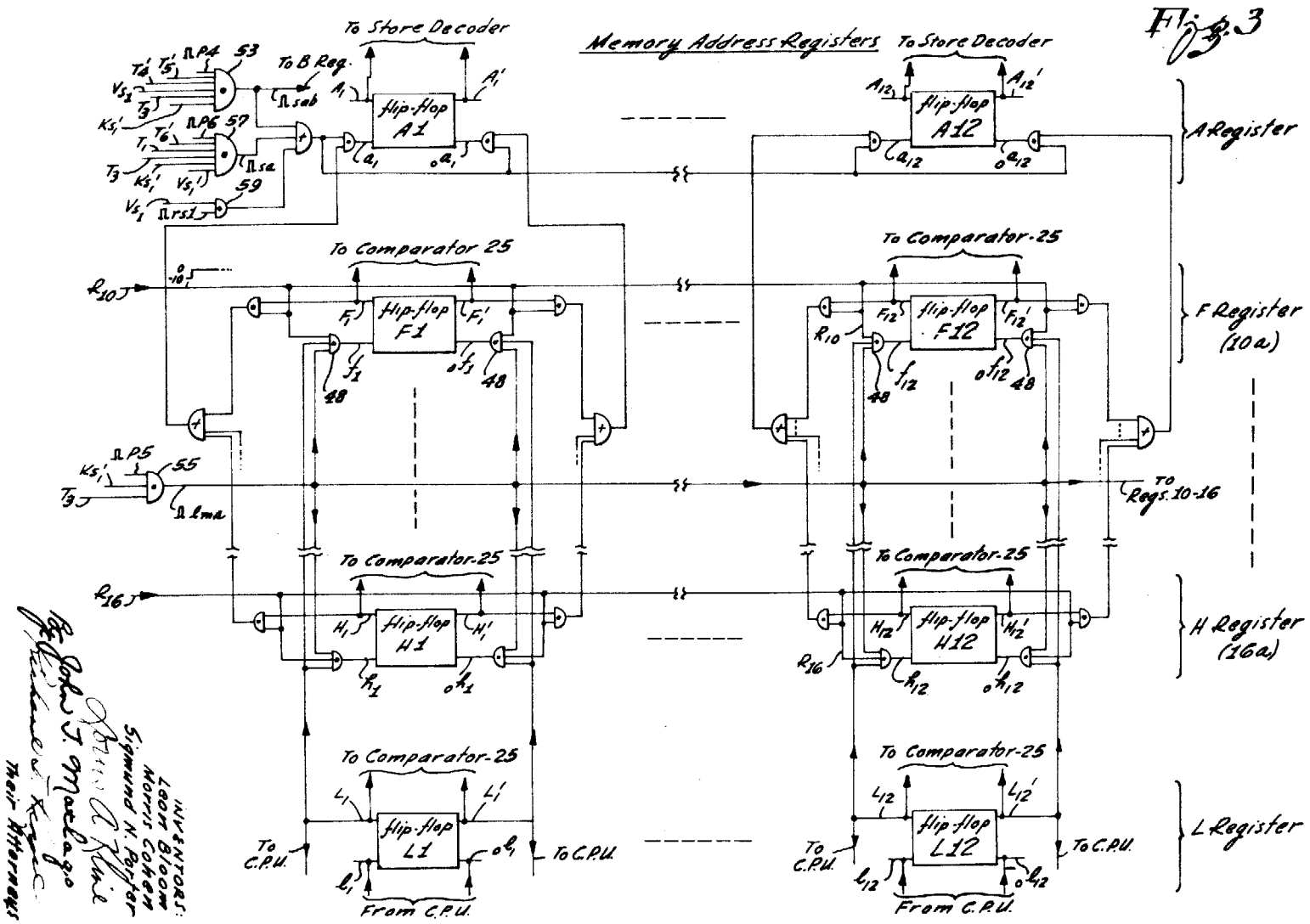

MEMORY ARRANGEMENT FOR ELECTRONIC DATA PROCESSING SYSTEM

Original Filed March 5, 1962

INVENTORS:
Leon Bloom
Morris Cohen
Sigmund N. Porter
Louis A. Klein
By John J. Maclago
Richard L. Kuegel
Their Attorneys

MEMORY ARRANGEMENT FOR ELECTRONIC DATA PROCESSING SYSTEM

Original Filed March 5, 1962

INVENTORS.
Leon Bloom
Morris Cohen
Sigmund N. Porter
Louis A. Kline
By John T. Matlago
Richard T. Lenzel
Their Attorneys

MEMORY ARRANGEMENT FOR ELECTRONIC DATA PROCESSING SYSTEM

Original Filed March 5, 1962 Sheet 7 of 9

INVENTORS
Leon Bloom
Morris Cohen
Sigmund N. Porter
By Louis A. Kline
John J. Matlago
Richard T. Regel
Their Attorneys

MEMORY ARRANGEMENT FOR ELECTRONIC DATA PROCESSING SYSTEM

Original Filed March 5, 1962

INVENTORS:
Leon Bloom
Morris Cohen
Sigmund N. Porter
By Louis A. Kline
John J. Maclago
Kirkland J. Kempel
Their Attorneys

MEMORY ARRANGEMENT FOR ELECTRONIC DATA PROCESSING SYSTEM

Original Filed March 5, 1962

INVENTORS:
Leon Bloom
Morris Cohen
Sigmund N. Porter
Louis A. Kline
By John J. Maclago
Kleiland & Kenyon
Their Attorneys United States Patent Office Re. 26,624
Reissued July 1, 1969

26,624

MEMORY ARRANGEMENT FOR ELECTRONIC DATA PROCESSING SYSTEM

Leon Bloom, Morris Cohen, and Sigmund N. Porter, Los Angeles, Calif., assignors to The National Cash Register Company, Dayton, Ohio, a corporation of Maryland Original No. 3,231,868, dated Jan. 25, 1966, Ser. No. 177,513, Mar. 5, 1962. Application for reissue July 17, 1968, Ser. No. 750,379
Int. Cl. G06f *7/10*
U.S. Cl. 340—172.5 12 Claims

Matter enclosed in heavy brackets [ ] appears in the original patent but forms no part of this reissue specification; matter printed in italics indicates the additions made by reissue.

*ABSTRACT OF THE DISCLOSURE*

*A memory arrangement for a data processor including a large capacity main memory and a small capacity fast-access memory into which data along with its address is stored after once being read out of the main memory. The next time this data is needed it is then rapidly made available to the processor logical circuits from the fast-access memory without having to access the main memory. When using this approach with a small capacity fast-access memory, the data once accessed from the main memory will very quickly fill the fast-access memory. Hence a usage indicator is provided to examine the fast-access memory to determine which of the data stored therein has been dormant for the longest period of time. The newest data accessed from the main memory is then used to replace the most dormant data and, if necessary, the most dormant is placed back into the main memory.*

The present invention relates to memory arrangements for electronic data processing systems and more particularly to memory arrangements for decreasing the average time required to provide access to information in data processing systems.

It is well known in the prior art that any data processing problem can be broken down into a sequence of simple arithmetic and logical operations or steps, each of which is carried out during a basic operating cycle by electronic components functioning at extremely high speeds. A plurality of such operations or steps can be self-sequenced by control circuitry to perform routines. Each of the routines is specified by an instruction, and a sequence of instructions is called a program. This program and all other necessary information needed to perform a problem are entered into the data processor's main store. The data processor thereafter carries out the instructions automatically and at high speed.

In most of the basic operating cycles carried out by a data processor, a transfer of information or data between the main store and the processing unit occurs. New data is drawn from the main store, logically processed, and then returned, frequently in modified form, and usually to the same location, in the main store. In the prior art data processors the time required for the data to be processed by the processing units can be made extremely short, while the time required to locate and transfer information between the main store and the processing unit is, generally, time consuming. Thus, in the prior art, each basic operating cycle of a data processor, during which a step of a problem is performed, generally provides for locating and "reading" data out of a specified address in the main store during the first half of each basic operating cycle, performing logic on the data "read out," and then "writing" the modified data back into the same address of the main store during the last half of the basic operating cycle. When using this approach not only does it take time to locate the data to be "read out" of the main store, but because the components used for the memory elements in the main store of the data processor are relatively "slow-acting," an appreciable portion of the operating cycle is required to perform the memory accessing. On the other hand, by operating on the data, once it is accessed, in parallel mode, it is possible to perform the actual logical operations specified during an operating cycle in a relatively short time. Thus, the time required to perform the logical operations can be made to be equal to but a small portion of the time period of an operating cycle. It would be highly desirable in processing systems, therefore, to minimize the need for accessing the main store in the above described manner during an operating cycle in order to perform the logical operations specified to be performed during that step. Thus, if the data to be operated upon by the logic during an operating cycle or step could be made available without the need for accessing the main store, and if no time were consumed in "writing back" data into the main store after the logic is performed, the data processor could be made to perform this sequence of steps at "logic speed," i.e., at a speed limited only by the time required to perform the logical operations of these processing steps, and thus the overall problem could be performed at a much faster rate, i.e., at a rate more nearly approaching "logic speed."

It should be noted that in many problems solved by data processors, once data is "read out" from a predetermined address of the main store, this data or a modified form of the data having the same address, is logically operated upon again and again, on successive operating cycles. An example of this would be a subroutine including words of information that are used repetitively. Thus the present invention contemplates the provision of a small capacity, fast look-aside memory means into which data along with its address is stored after once being "read" from the main store. The next time this data is needed, it can then be made available to the logical circuits in the processing unit without having to access the main store, thus enabling an operating cycle to be performed at a faster rate. Obviously, when using this approach with a limited capacity fast-access memory, the data once accessed from the main store will very quickly fill the fast-access memory. Hence it is contemplated in the present invention that a means is provided to examine the fast-access memory during each operating cycle to determine which of the data stored therein has been dormant for the longest period of time. The newest data accessed from the main store is then used to replace the most dormant data and, if necessary, the most dormant data is placed back into the main store.

It is, therefore, an object of the invention to provide improved apparatus for processing data rapidly and more efficiently.

It is another object of the invention to provide apparatus for minimizing the number of times a data processor may be required to access a main store in order to perform a program.

It is another object of this invention to provide a fast acting, small capacity, look-aside memory into which a limited amount of active data, once accessed from the main store, can be retained in the memory for use in subsequent logical operations.

Another object of this invention is the provision of a fast memory means for storing data accessed from the main store and means for quickly determining that said data is stored in the fast memory means such that logical operations can be performed on this data at high speeds.

A further object of this invention is to provide analog means associated with a memory for determining recent usage of the information stored therein.

A still further object of this invention is the provision of a small capacity memory in which the information is retained therein on the basis of a recent usage of this information.

Still another object of the present invention is to provide means for displacing information stored in a small capacity memory because of lack of recent usage of this information.

Another object of this invention is to transfer all information to and from a main store through a small capacity, fast-access memory.

Another object of this invention is the provision of means for indicating when information that is stored in a memory is altered or unaltered.

Another object of this invention is to reduce the number of accesses to the main store by "writing back" only the altered information into a main store from a small capacity, fact-access memory.

Another object of this invention is to have a data processor access information exclusively from a small capacity, fast-access memory.

A further object of the present invention is to provide analog means for controlling logical decisions in a digital data processing system.

With these and other objects in view, as will hereinafter more fully appear, and which will be more particularly pointed out in the appended claims, reference is now made to the following description taken in connection with the accompanying drawings in which:

FIG. 3 is a schematic diagram of a portion of the flip-flop circuits for the address registers for storing the addresses of words in the memory arrangement of the present invention, to illustrate the transfer of addresses between addresses registers in typical operations of the memory;

Figure 1:
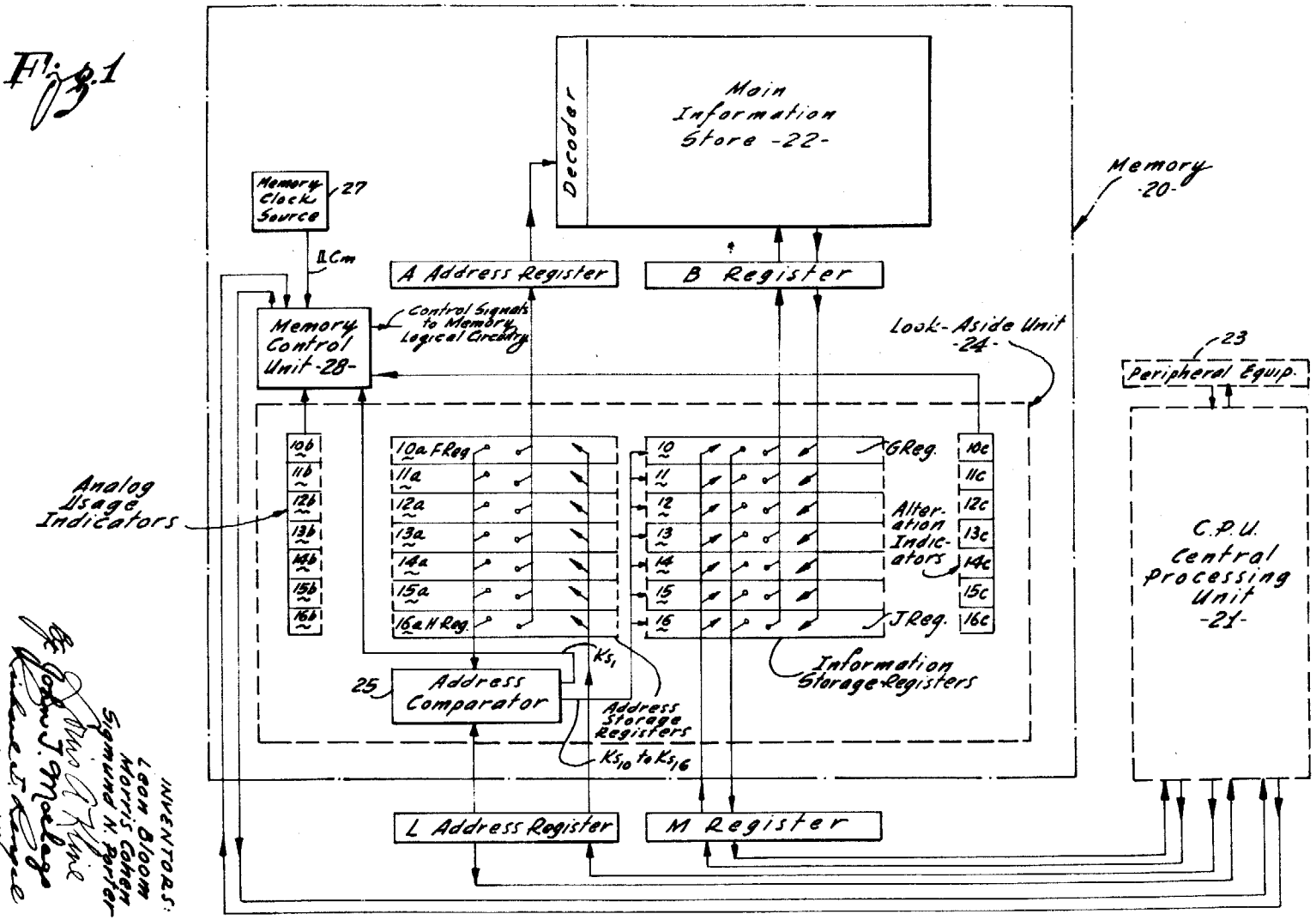
FIG. 1 is a schematic block diagram of a data processing system showing the improved memory arrangement of the present invention.
Figure 8:
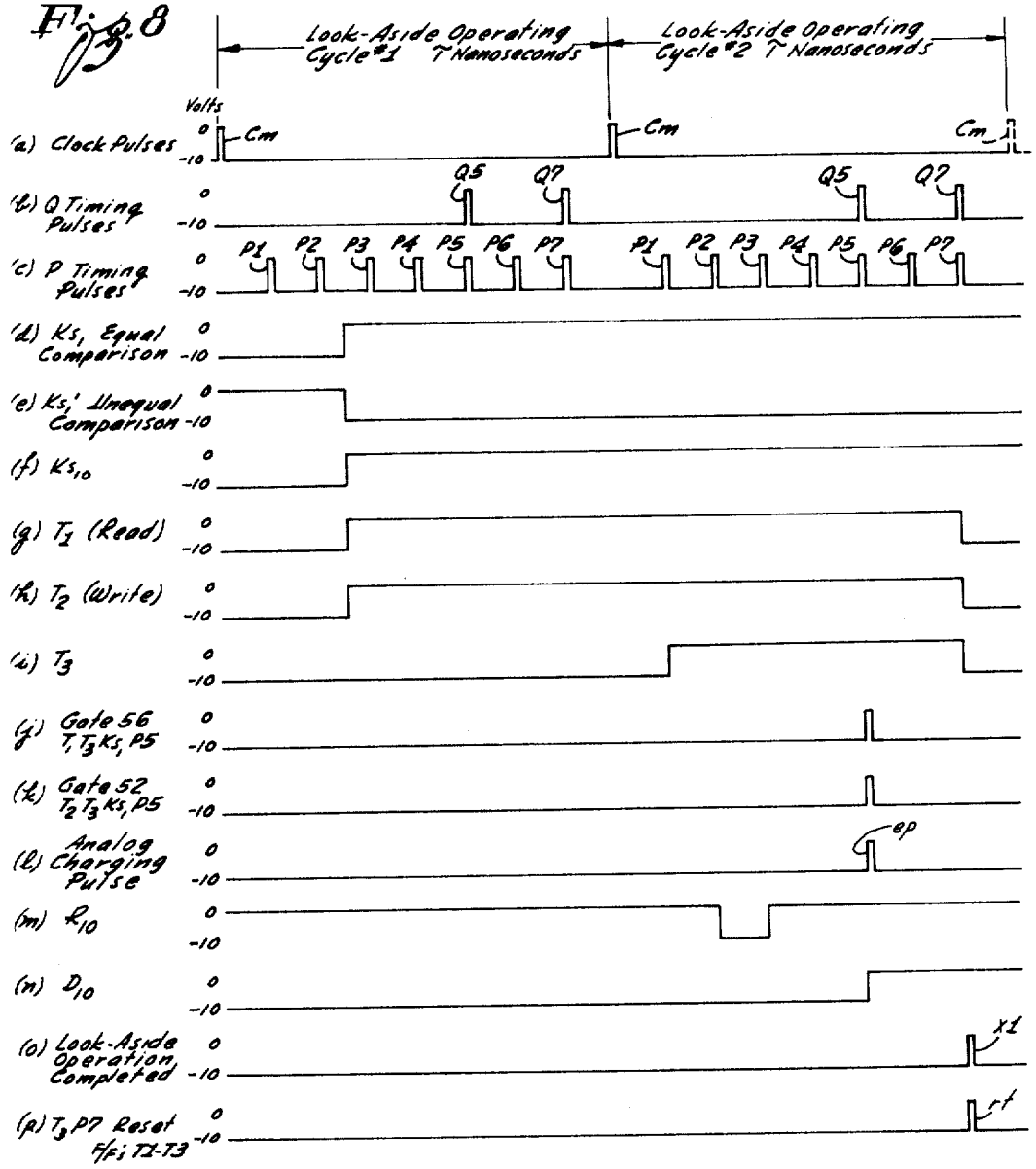
Figure 9:
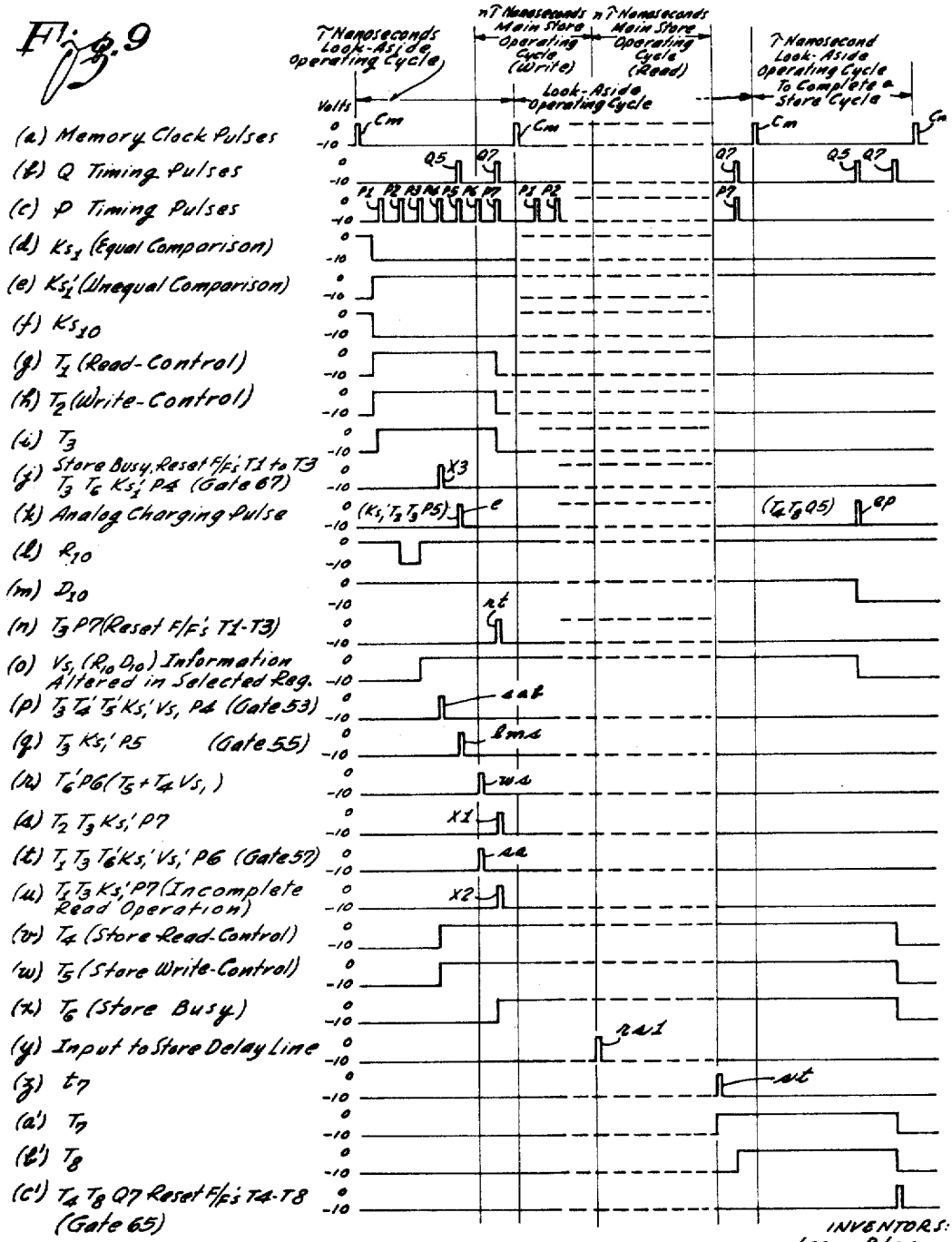

FIG. 8 is a timing diagram for illustrating typical operations of the memory arrangement of the present invention during typical look-aside operating cycles when a word of information being accessed is stored in one of the information registers of the look-aside unit shown in FIG. 1; and FIG. 9 is a timing diagram for illustrating typical operations of the memory arrangement of the present invention during look-aside and main store operating cycles when the word of information being accessed is not stored in any one of the information storage registers of the look-aside unit shown in FIG. 1.

Referring now to the drawings and particularly to FIG. 1 thereof, an illustrative embodiment of this invention is seen to comprise a data processing system which includes a memory 20, a central processing unit 21, peripheral equipment 23, and an L address register and an M information register which are located between the memory 20 and the central processing unit 21. The memory 20 comprises a main information store 22 in which the information for executing programs is stored, e.g., information comprising the instructions which specify the program to be performed along with the data to be operated upon in the execution of the program. Also included in the memory 20 are a look-aside unit 24, a memory clock source 27, a memory control unit 28 and an A address register and a B information register. The memory control unit 28 controls the operation of the entire memory 20 and also sends certain signals, indicating the end of look-aside operating cycles, to the central processing unit 21.

As shown and described in the preferred embodiment, the central processing unit 21 (C.P.U.) which comprises a data processor, a program control, and a peripheral control, has access to all the words in the memory 20 through the L and M registers. When the address of a word of data or instruction is placed in the L register and the addressed word is in the look-aside unit 24, a transfer of information between the M register and the look-aside unit 24 is provided in a look-aside operating cycle at a very fast rate. When the address of a word placed in the L register is not in the look-aside unit 24 at the time, and the store 22 is not busy, the address and word are transferred into the look-aside unit for a write operation or, if a read operation, operating cycles in the store 22 are initiated to place this word in the look-aside unit 24 from the store 22.

The look-aside unit 24 comprises an address comparator 25, look-aside registers including information storage registers 10 to 16 and address storage registers 10a to 16a, analog usage indicators 10b to 16b, and alteration indicators 10c to 16c. A single one of the information storage registers 10 to 16 is capable of storing the contents of any cell (word) in the store 22. Each of the address storage registers 10a to 16a is capable of storing the address of any cell in the store 22. The analog usage indicators 10b to 16b provide one indicator for each set of address and information storage registers in the look-aside unit 24 to indicate the recent usage of the words stored therein. The alteration indicators 10c to 16c provide one indicator for each set of address and information registers in the look-aside unit 24 to indicate whether or not the words stored therein have been altered by "writing" into the information register of the respective set of look-aside registers.

In the preferred embodiment of the invention as shown and described herein, each of the information storage registers 10 to 16 comprises twelve flip-flops for storing a word of information having a word length of twelve binary digits. The word length of the information storage registers 10 to 16, therefore, corresponds to the length of the word stored in any of the cells in the information store 22. Accordingly, the M register and the B register also each comprise twelve flip-flops for storing the words during periods of access. The address storage registers 10a to 16a, the L address register, and the A address register each comprise twelve flip-flops for storing addresses of twelve binary digits to provide addresses for any one of the words in the store 22 which has a storage capacity, e.g., of four thousand and ninety-six words.

As shown in FIG. 1, the storage capacity of the look-aside unit 24 of the preferred embodiment of the present invention, is extremely small, e.g., seven words, relative to the storage capacity of four thousand and ninety-six words provided in the store 22. This would be expected, since the store 22, which has been illustrated in the preferred embodiment as magnetic core storage, provides the necessary greater storage capacity for the system, for the structure involved, than the look-aside flip-flop registers. Accordingly, the words stored in the registers of the look-aside unit 24 must be displaced, depending on the current need for the words stored therein, in order to provide fast-access to the words currently being accessed by the processing unit 21.

To the extent of its word storage capacity, words temporarily stored in the information storage registers 10 to 16 in the look-aside unit 24, therefore, comprise words of information currently being accessed in the execution of the program as requested by the central processing unit 21, e.g., words of instructions and data for a routine or sub-routine of the program currently being executed by the data processing system. Access to the words stored in the look-aside unit 24 is provided at "logic speed" which is much faster than the rate of access to words stored in the main store 22.

In order to keep the words of information stored in the look-aside unit 24, current, or up to date, with the words of instruction or data being accessed from the memory 20 in the execution of the program routines, the recent usage of the words stored in the look-aside unit 24 is constantly being appraised by analog usage indicators 10b to 16b. These analog usage indicators 10b to 16b continuously provide an indication of which one of the look-aside registers 10 to 16 contains the word which has not been accessed for the longest period of time. On this basis of evaluation of need for words in the execution of program routines, the words in the look-aside registers 10 to 16 are automatically kept current with the words being accessed in the execution of the program. More specifically, the evaluation of need is based oupon the premise that words currently being accessed in the execution of a program are, in many instances, accessed again or repeatedly within a very short period of time and, upon a repeated request for a word, it will be stored in one of the look-aside registers 10 to 16. Therefore, repeated access to particular word or words will tend to cause the word or words to remain in the look-aside unit 24 during the period of time in which repeated accesses are made.

Referring to FIG. 1, a general description will now be set forth of typical operations of the memory 20. The first operation to be generally described is a "read" operation wherein a word being accessed is stored in the look-aside register 10. This word, or any other single word stored in the look-aside registers 10 to 16, is capable of being "read" at "logic speed" in one complete "read" look-aside operating cycle. The address of the word to be accessed is placed in the L register and a read-control flip-flop T1 (FIG. 2) in the memory control unit 28 is set by the processing unit 21 to initiate the "read" operation. A comparison is made, in the address comparator 25, of the address in the L register and the addresses in the look-aside address registers 10a and 16a. Since it has been assumed, for purposes of explanation, that the word being accessed is stored in register 10, the like addresses in the L register and register 10a will produce high outputs $Ks_1$ and $Ks_{10}$ from the comparator 25. The high output $Ks_1$ is coupled to the memory control unit 28 to provide control signals which are coupled to the M register. The output $Ks_{10}$ is coupled to the register 10 to provide for the selective transfer of the word stored in this register to the M register. These control signals provide for the transfer from the selected one of look-aside register 10 to 16 into the M registers during the following look-aside operating cycle.

The next operation to be generally described is the "write" operation when the word being accessed is stored in the look-aside unit 24. The word is "written" into unit 24 at "logic speed" in one complete "write" look-aside operating cycle. An address and word are placed in the L register and the M register during operation of the processing unit 21 and a write-control flip-flop T2 (FIG. 2) in the memory control unit 28 is set by the processing unit 21 to initiate the "write" operation. Assuming the address placed in the L register is the same as the address in the look-aside register 10a, the comparator 25 will produce outputs $Ks_1$ and $Ks_{10}$. The memory control unit 28 then will provide control signals which are coupled to the register 10. The high output $Ks_{10}$ is also coupled to register 10. The combination of control signals and high output $Ks_{10}$, provides for the transfer of the word of information from the M register to the register 10 in a complete "write" look-aside operating cycle. In the same cycle, the alteration indicator 10c is set to indicate that the word stored in register 10 has been altered.

The next operation to be generally described is the "read" operation when a new word to be accessed is not stored in the look-aside memory unit 24, but is stored in the main information store 22. This operation is initiated in the same manner as the "read" operation described supra. However, upon comparison in comparator 25, an output $Ks_1'$ will be produced which is coupled to the memory control unit 28 to produce control signals for accessing the word from the main store 22. The operations for accessing the new word from the store 22 include displacing the least used word which is stored in one of the look-aside registers 10 to 16. This register is designated by one of the analog usage indicators 10b to 16b. Assuming the indicator 10b is set indicating that register 10 contains the least used word, then, if the alteration indicator 10c is set, this least used word and its address in register 10a will be transferred to the B register and the A register, respectively, in order to be "written-back" into the main store 22. Later, during this same look-aside operating cycle, the address of the new word in the L register is transferred to the address register 10a. Still later, during this same look-aside cycle, an operating cycle is initiated in the main store 22 by a control signal from the memory control unit 28. Finally, the read-control flip-flop T1 (FIG. 2) in the memory control unit 28 is reset to provide for continuing the look-aside operating cycles for accessing other words of information whose addresses are placed in the L register during the time period of operating cycles of the store 22.

The operating cycle of the store 22, which was initiated as stated before, "writes" the displaced word into the main store 22 from the B register at the address which is stored in the A register. After this first operating cycle of the main store 22 is completed, the address of the new word in register 10a is transferred to the A register and a second operating cycle of the main store 22 is initiated to "read" out the new word. At the end of this second operating cycle of the main store 22, the new word will have been "read out" of the main store 22 and into the B register, and a special look-aside operating cycle is provided to transfer this new word from the B register to the register 10. This completes the "read" operation when the word being accessed is not stored in the look-aside unit 24. It should be noted in connection with the foregoing, that if the alteration indicator 10c is not set, thereby indicating that the word to be displaced has not been altered, the first operating cycle of the main store 22 is neither needed nor provided, and only one operating cycle of the main store 22 is provided in order to "read-out" the new word.

The next operation to be described in the "write" operation when the word being accessed is not stored in the look-aside unit 24. The word being accessed and its address are placed in the M register and the L register, respectively, and the write-control flip-flop T2 (FIG. 2) in the memory control unit 28 is set. During the look-aside operating cycle which follows, an output $Ks_1'$ is produced by the comparator 25 which indicates that the address of the word is not in the look-aside registers 10a to 16a. Again, it is assumed that the word in the register 10 is to be displaced as indicated by a high output from analog usage indicator 10b. The word in the register 10 and its address in register 10a are transferred to the B register and the A register, respectively. Next, the new word in the M register and its address in the L register are transferred to the register 10 and the register 10a, respectively. At the termination of this operation alteration indicator 10c is set. This completes the "write" operation if the displaced word had not been altered as evidenced by alteration indicator 10c not initially being set. If the displaced word had been altered, a high potential level output signal $Vs_1$ (FIG. 7) provided by alteration indicator 10c is coupled to the memory control unit 28 to set a write-control flip-flop T5 (FIG. 2) to provide control signals for initiating a main operating cycle for "writing" the displaced word back into the main store 22.

The foregoing description of the operation of the memory 20 assumed that the main store 22 was not busy, i.e., the main store 22 is not in a main store operating cycle, during the look-aside operating cycles. Look-aside cycles (either "read" or "write") in which the word being accessed is stored in the look-aside unit 24 are not affected by the busy condition of the main store 22 and normal operation includes accessing words stored in the look-aside unit 24 during operating cycles of the store 22. However, whenever the main store 22 is busy and an address is placed in the L register for accessing a word that is not stored in the look-aside unit 24, the control unit 28 will terminate operations in the look-aside cycle, send control signals to the processing unit 21 indicating this condition, and also prepare for accessing another word (whose address will be placed in the L register) in the following look-aside operating cycle.

Referring now to FIGS. 1 to 8, a more detailed description will be given of typical operations of the memory 20 (FIG. 1) during a look-aside operating cycle when the word being accessed is stored in one of the look-aside registers such as the look-aside register 10. The processing unit 21 initiates the operation of the memory 20 by placing an address of a word in the L register and setting the read-control flip-flop T1 (FIG. 2) in the memory control unit 28 for a "read" operation, or placing an address in the L register and information in the M register and setting a write-control flip-flop T2 (FIG. 2) for a "write" operation. Upon either a "write" operation or a "read" operation being initiated in the foregoing manner, a comparison is made between the address in the L register and all of the addresses in the address storage registers 10a to 16a by the comparator 25 (FIG. 5) to determine if the addressed word is in one of the look-aside registers 10 to 16.

For the purpose of explanation, it has been assumed that the address placed in the L register is the address of a word which has been accessed previously in the execution of a program routine and is now stored in the look-aside storage register 10. A comparison in the comparator 25 of the address stored in the L register and the address stored in the look-aside address register 10a, therefore, will produce high level logical potentials at outputs $Ks_1$ and $Ks_{10}$ (FIGS. 8d and 8f) of drivers Ks1 and Ks10 of the comparator 25, shown in FIG. 5. The high output $Ks_1$ indicates like addresses have been compared and the word being accessed is stored in one of the look-aside registers 10 to 16. The high output $Ks_{10}$ indicates that like addresses are in the L register and the look-aside register 10a and the word being accessed is stored in the look-aside register 10.

If the read-out control flip-flop T1 (FIG. 2) is set for a "read" operation, the word stored in the information storage register 10 is transferred to the M register during the next complete look-aside operating cycle. As shown in FIG. 8, the next complete look-aside operating cycle, after flip-flop T1 is set to produce a high logical potential level at output $T_1$ (FIG. 8g), is look-aside operating cycle #2. A control flip-flop T3 (FIG. 2) is set at the beginning of a look-aside cycle only, and a high output $T_3$ is necessary to produce "read" or "write" operations in a look-aside cycle. This is necessary to synchronize the operations of the memory 20 and the central processing unit 21 which are assumed to be operating asynchronously. If the memory 20 and processing unit 21 were operated in synchronism, there would be no need to synchronize the operations.

Figures 2, 2A:
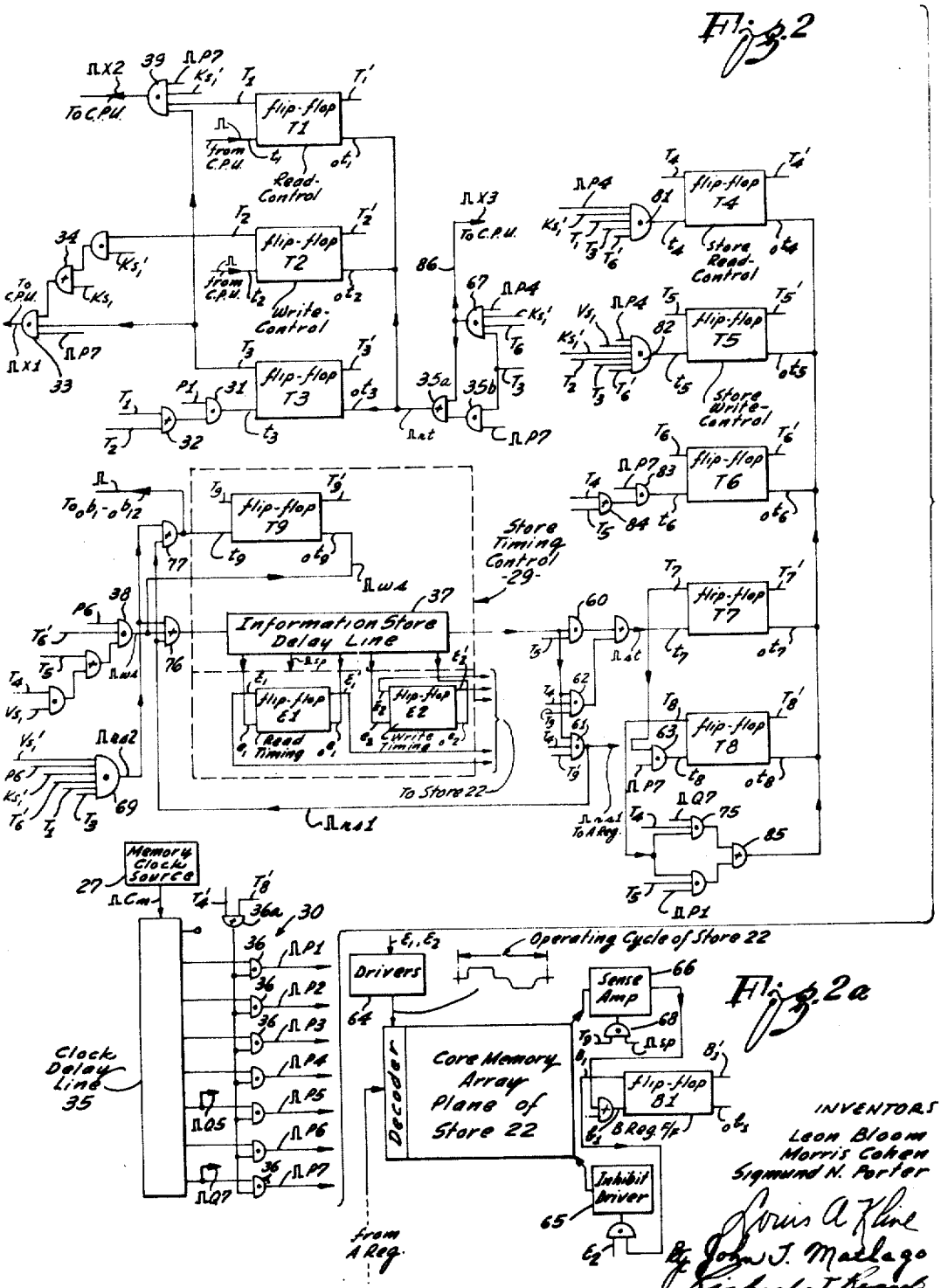
FIG. 2 is a schematic block diagram showing the details of the memory control unit shown in FIG. 1.
FIG. 2a is a schematic presentation of a portion of the main information store, shown in FIG. 1, for illustrating its operation.
Figure 4:
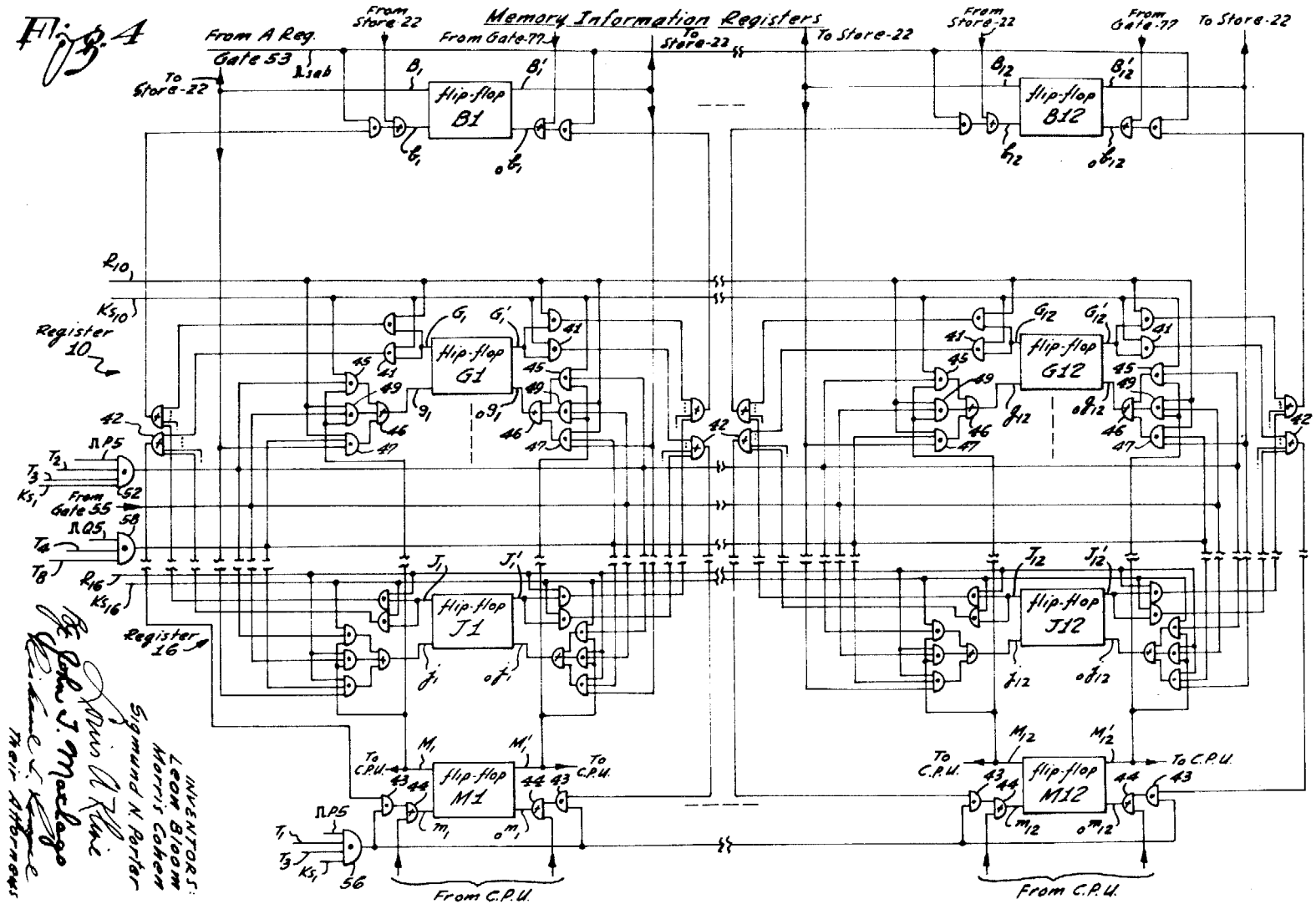
FIG. 4 is a schematic diagram of a portion of the flip-flop circuits for the information storage registers for storing words in the memory arrangement of this invention to illustrate the transfer of information between information registers in typical operations of the memory.

The logical circuitry for transferring information from the look-aside register 10 to the M register during a look-aside operating cycle for a "read" operation is shown schematically in FIG. 4. The high level logical potential (Ov) of the output $Kc_{10}$ (FIG. 8f) enables "and" gates 41 in the output circuits of the flip-flops G1–G12 of the register 10 to transfer the information from the register 10 to the M register. The outputs of gates 41 are coupled through "or" gates 42 to "and" gates 43, which are coupled to the respective inputs of the M register flip-flop M1–M12 through "or" gates 44. The transfer of the word from the look-aside register 10 to the M register is completed by the high logical potential level pulse (FIG. 8j) formed by the inputs of "and" gate 56 and applied onto "and" gates 43. This high logical level potential pulse is produced at the output of the gate 56 by high level potentials from the output $Ks_1$ (FIG. 8d), the output $T_1$ (FIG. 8g), the output $T_3$ (FIG. 8i), and the high potential timing pulse P5 (FIG. 8c, cycle #2). It should be noted that control flip-flop T3 (FIG. 2) is set near the beginning of look-aside operating cycle #2 by the output of an "and" gate 31 (FIG. 2) having inputs consisting of a timing pulse P1 (FIG. 8c, cycle #2) and the output of "or" gate 32 (FIG. 2). In this manner, the addressed word in the look-aside register 10 is transferred to the M register in a "read" operation during look-aside operating cycle #2 (FIG. 8).

For a "write" operation in the look-aside unit 24, instead of a "read" operation as described supra, the write-control flip-flop T2 (FIG. 2) is set instead of the read-control flip-flop T1 and an equal comparison of addresses of the L register and the look-aside address register 10a in the comparator 25 (FIG. 5), produces a transfer of the word of information placed in the M register to the look-aside register 10.

As shown by the logical circuitry in FIG. 4, the transfer of information from the M register to the look-aside register 10 is accomplished during a look-aside operating cycle, e.g., look-aside operating cycle #2 (FIG. 8) by enabling "and" gates 45 which couple the outputs of the M register flip-flops M1–M12 to the respective inputs of the flip-flops G1–G12 of the look-aside register 10 through "or" gates 46. The "and" gates 45 are enabled by high potential levels from the output $Ks_{10}$ (FIG. 8f) and "and" gate 52. The output of gate 52 (FIG. 8k) is high (Ov) during the timing pulse P5 (FIG. 8c) when outputs $T_2$ and $T_3$ (FIGS. 8h and 8i) are high and the output $Ks_1$ (FIG. 8d) is high. Thus the transfer of information from the M register to the look-aside register 10 is completed in the look-aside cycle #2 at the time of timing pulse P5 (FIG. 8c, cycle #2). In addition to this transfer of information, the alteration of information in the register 10, as a result of the "write" operation, is indicated by setting flip-flop D10 to produce a high output $D_{10}$ (FIG. 8n) in the alteration indicator 10c shown in FIG. 7. An "and" gate 70 (FIG. 7) is enabled by the high output $Ks_{10}$ to pass the pulse output of "and" gate 71 (FIG. 7) having inputs connected to high outputs $T_2$, $T_3$, and $Ks_1$ to pass the pulse P5 (FIG. 8c, cycle #2).

Figure 6:
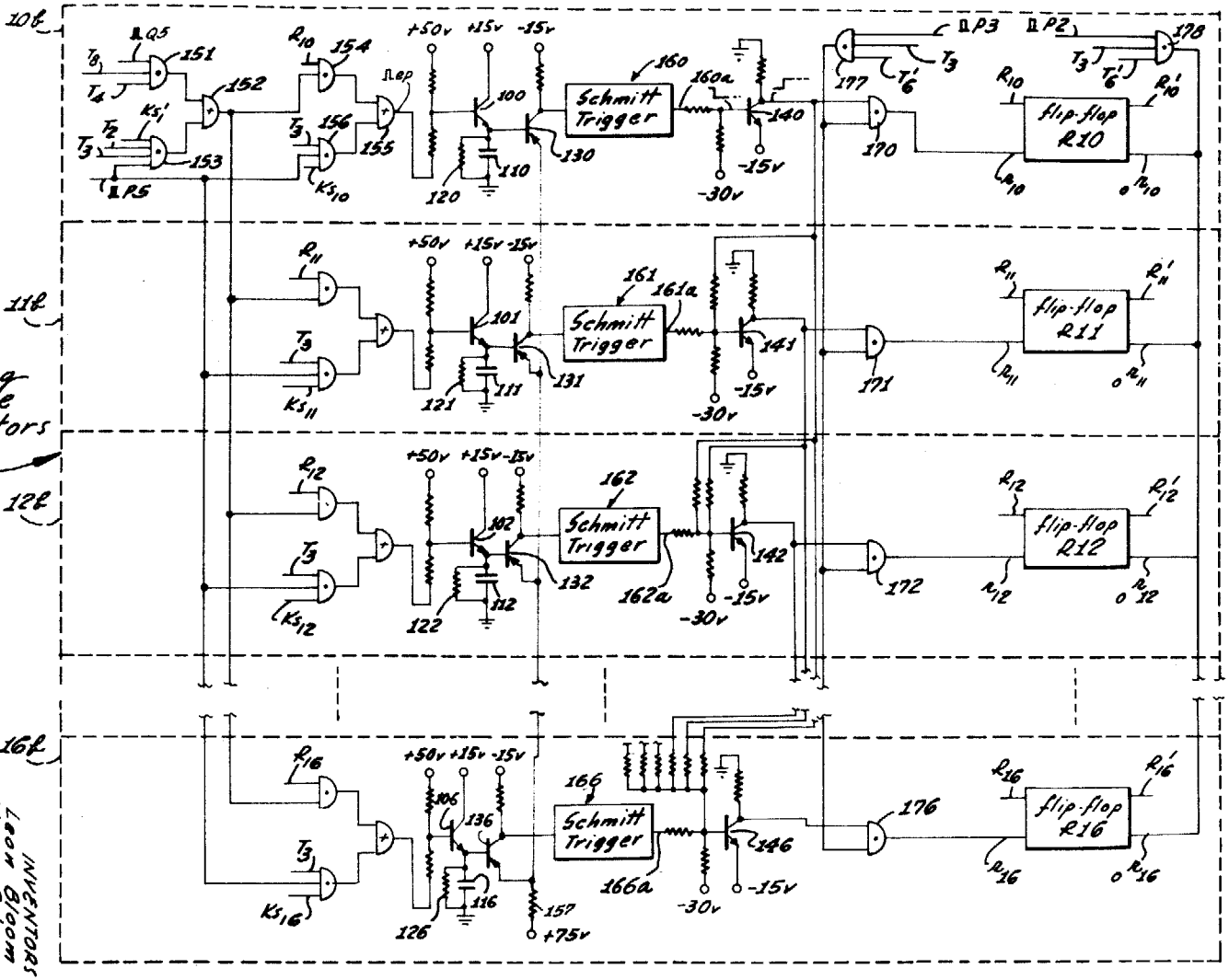
FIG. 6 is a schematic circuit diagram, partially in block form, of certain ones of the analog usage indicators shown in FIG. 1, to illustrate their operation in providing a substantially continuous indication of one of the registers in the look-aside units containing information having the least recent usage.

In order to provide an indication of recent usage of the word stored in register 10, both "read" and "write" operations in the look-aside register 10 produce a charging pulse ep (FIG. 8l) by enabling "and" gate 156 of the analog usage indicator 10b shown in FIG. 6. High outputs $T_3$ (FIG. 8i) and $Ks_{10}$ (FIG. 8f) enable the gate 156 to pass the timing pulse P5 (FIG. 8c, cycle #2), to produce the charging pulse ep at the output of "or" gate 155. The pulse ep "turns on" transistor 100 to fully charge the capacitor 110 for reasons which will be clear from the detailed description of FIG. 6 set forth later in this disclosure. Also, a "look-aside operation completed" pulse X1 (FIG. 8o) is produced subsequent to each of the described "read" and "write" operations by enabling "and" gate 33, shown in FIG. 2, by the high output $T_3$, timing pulse P7 (FIG. 8c, cycle #2) and the high output of "or" gate 34 that is connected to a high output $Ks_1$ (FIG. 8d). Resetting of flip-flop T1–T3, at the end of each of the above described look-aside operating cycles #2, is provided by enabling "and" gate 35b (FIG. 2) to pass the timing pulse P7 to "or" gate 35a to produce a reset pulse rt (FIG. 8p) at the reset inputs ${}_0t_1$–${}_0t_3$ of flip-flops T1–T3. Resetting of the flip-flops T1–T3 prepares the memory control unit 28 (FIG. 1) for the next look-aside operating cycle.

The foregoing completes the detailed description of the operations during complete look-aside operating cycles for "reading" and "writing" operations in which the word being accessed is stored in the look-aside register 10a. These operations are typical and operations involving the other registers 11 to 16 are similar. Before a detailed description of the operations of the memory is presented that involve accessing words which are not stored in any of the look-aside registers 10 to 16, a brief description, that follows, of the memory control unit 28 will provide a better understanding of these operations.

As shown in FIG. 2, the memory control unit 28 comprises a timing pulse source 30 for timing look-aside cycles, control flip-flops T1–T8 and associated logical circuitry, and a store timing control 29 for controlling operating cycles of the store 22. The memory timing pulse source 30 comprises a clock delay line 35, e.g., a delay line providing 1000 nanoseconds time delay, which is connected to the output of a memory clock source 27, e.g., a one megacycle frequency clock source. From the clock delay line 35, eight outputs are available from output lines as shown, the first output line having no output connections and the latter seven being connected to respective "and" gates 36 to provide equally spaced timing pulses P1 and P7 (FIGS. 8c and 9c) for timing the operations in each of the look-aside operating cycles. The gates 36 are enabled by a high output (Ov) from "or" gate 36a during all look-aside cycles except a "look-aside operating cycle to complete a store cycle." Timing pulses Q5 and Q7 (FIG. 8b) are produced each and every look-aside cycle and are taken directly from the output lines, as shown, for timing operations of the "look-aside operating cycle to complete a store cycle" (FIG. 9). The control flip-flops T1–T3 control the operations of the look-aside until 24 during all look-aside operating cycles except the "look-aside operating cycle to complete a store cycle," indicated in FIG. 9. The control flip-flops T4-T6 control certain operations of the look-aside unit 24 dupring operating cycles of the store 22, while flip-flops T7 and T8 control certain operations during "look-aside cycle to complete a store cycle" which follow each of the "read" operating cycles of the store 22.

The store timing control 29, as shown in FIG. 2, controls the operations of the store 22 during operating cycles of the store 22. The store timing control 29 comprises a delay line 37 that has output lines, as shown, which are connected to timing flip-flops including timing flip-flops E1 and E2. Flip-flops E1 and E2 are set and reset by sequential pulses supplied from the delay line output lines as a pulse from "or" gate 76 passes through the delay line 37. The true outputs of the flip-flops E1 and E2 supply the timing control signals for controlling drivers 64 and inhibit drivers 65 of the store 22, as illustrated in FIG. 2a by the drivers 64 and 65 for one of twelve core planes of the store 22. A control flip-flop T9 (FIG. 2) is set during operating cycles for "reading" from the store 22 to provide an output $T_9$ which enables "and" gate 68 (FIG. 2a) to pass the strobe pulse sp to sense amplifiers (e.g., sense amplifier 66 shown in FIG. 2a) of the store 22 to pass the amplified outputs of the core memory arrays of the store 22 during the operating cycles for "reading" from the store 22 into the B register. The pulse output of an "or" gate 77, which sets flip-flop T9 for "read" operating cycles of the store 22, is also coupled to the reset inputs ${}_0b_1$–${}_0b_{12}$ of flip-flops B1–B12 (FIG. 4) to clear the B register before "read out" from the store 22.

Referring again to FIG. 1 and also to FIGS. 2 to 7 and 9, a detailed description will next be presented of the operation of the memory 20, and more particularly, a detailed description of "read" and "write" operations in the memory 20 wherein the word to be accessed is not stored in the look-aside registers 10 to 16. It should be noted that whenever a new word is to be accessed that is not stored in the look-aside registers 10 to 16, one of the words in a selected one of the look-aside registers 10 to 16 must be displaced to provide storage space therein for this new word.

Figure 5:
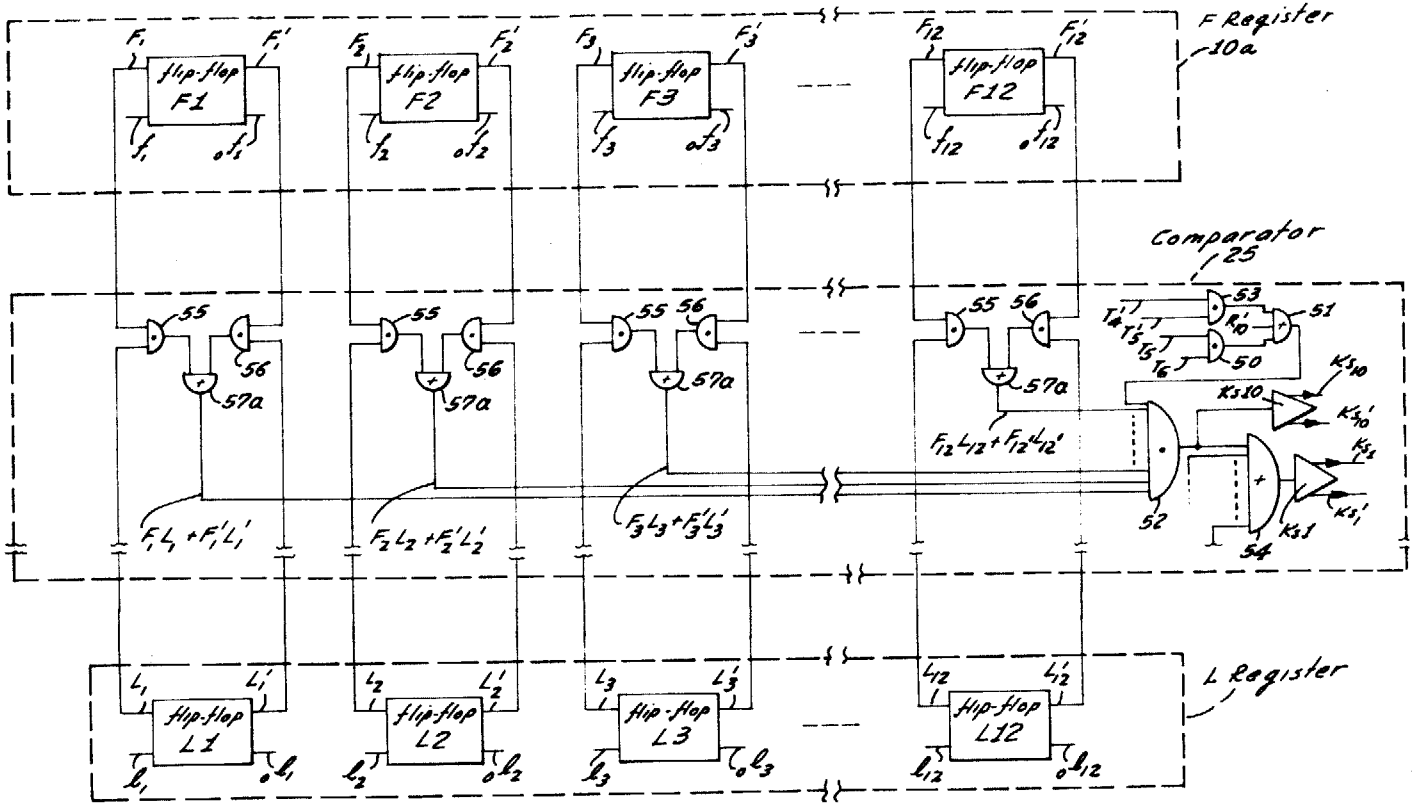
FIG. 5 is a schematic block diagram of portions of the logical circuitry of the address comparator, the address register for the memory and one of the address storage registers shown in FIG. 1, for illustrating the operation of the address comparator.

Considering a "read" operation first, when an address of a new word is placed in the L register for a "read" operation and the address is not in the look-aside address registers 10a to 16a, a look-aside operating cycle is followed by at least one operating cycle of the store 22 to "read-out" the new word from the store 22. In addition, a "look-aside operating cycle to complete a store cycle" (FIG. 9) is required to place the new word that is "read out" from the store 22 into the selected one of the look-aside registers 10 to 16. The look-aside operating cycle to produce a "read" operation is initiated in the look-aside unit 24 by setting read-control flip-flop T1 as shown in FIG. 2. Since it has been assumed, for purposes of explanation, that the word to be accessed is not in the look-aside registers 10 to 16, e.g., when the addressed word is being accessed for the first time, the comparison of the address in the L register and the addresses in the look-aside address registers 10a to 16a in the comparator 25 will produce a high logical potential level output $Ks_1'$ (FIG. 9e) from the comparator driver Ks1, as shown in FIG. 5. This output $Ks_1'$ specifies that the address placed in the L register is not in the look-aside registers and a word in one of the look-aside registers 10 to 16 must be displaced in order to provide storage space therein for the new word being accessed.

On the basis of recent usage of the words in the look-aside registers 10 to 16, described briefly earlier in this disclosure, one of the analog usage indicators 10b to 16b (FIG. 6) indicates that its associated look-aside register contains the word which has had the least recent usage, and therefore, is the word to be displaced. For the purpose of explanation, it is assumed that, of all the words stored in the look-aside registers 10 to 16, the word stored in the look-aside register 10 has had the least recent usage; or the word in register 10 is among a group of words in the look-aside registers 10 to 16 having the least recent usage and this word is in the lowest order look-aside storage register containing a word in this group. Thus, the word in register 10 is designated to be displaced, which is indicated by a high output $R_{10}$ (FIG. 9l) of the flip-flop R10 in the analog usage indicator 10b (FIG. 6), to provide storage space in the look-aside registers 10 to 16 for the new word to be "read-out" of the store 22. It should be noted that the high output of the analog usage indicators (e.g. $R_{10}$) designates the selected set of address and information look-aside registers (e.g. 10 and 10a)

for the transfer of address and information into and out of look-aside unit 24.

Before the new word can be "read out" of the store 22, the word being displaced from register 10 must be "written back" into the store 22 if it has been altered, e.g., altered by a "write" operation which has changed the word while the word is stored in look-aside register 10. The alteration indicator 10c, having a flip-flop D10 shown in FIG. 7, indicates whether or not the word in register 10 has been altered. If the word in the selected look-aside register 10 has been altered, the output $D_{10}$ (FIG. 9m) of flip-flop D10 is high and the output $Vs_1$ (FIG. 9o) of driver Vs1 (FIG. 7) is high. In the presence of high output $Vs_1$ and other inputs to "and" gate 53 (FIG. 3), the pulse sab (FIG. 9p) is produced at the time of pulse P4 to transfer the word in the selected look-aside register 10 to the B register (FIG. 4) and its address, in the address register 10a, to the A register (FIG. 3) in preparation for a "write" operating cycle in the store 22. Also, at the time of pulse P4, read-control flip-flop T4 (FIG. 2) in the memory control unit 28 is set by the output of an "and" gate 81 to provide the proper control signals for a "read" operation involving an operating cycle of the store 22. At the time of the timing pulse P5 (FIG. 9c), which is coupled to "and" gate 55 (FIG. 3), a pulse lms (FIG. 9q) is produced. The pulse lms and high output $R_{10}$ enables "and" gates 48, which are connected to the inputs of flip-flops F1 to F12 as shown in FIG. 3, to transfer the address in the L register to the look-aside address register 10a.

Having transferred the displaced word and its address from look-aside registers 10 and 10a to the B register and the A register, respectively, the next timing pulse P6 (FIG. 9c) is passed by "and" gate 38 (FIG. 2) to produce an output pulse ws (FIG. 9r), which is applied to the information store delay line 37 (FIG. 2) and to reset input $_0t_9$ of flip-flop T9, to initiate a "write" operating cycle in the store 22. At the time of the next timing pulse P7 (FIG. 9c), and during the aforesaid operating cycle of the store 22, the look-aside cycle is completed by: setting flip-flop T6 (FIG. 2) to indicate the store 22 is now busy; resetting flip-flop T1–T3 to prepare for the next look-aside operating cycle; and, producing a pulse X2 (FIG. 9u). The pulse X2, which is produced at the output of "and" gate 39 (FIG. 2), is coupled to the processing unit 21 to signal that the look-aside cycle has been completed but the "read" operation is incomplete because the addressed word is not in the look-aside registers 10 to 16. The pulse X2 also indicates that the addressed word is in the process of being accessed from the store 22 and, therefore, is not in the M register.

After the "write" operating cycle in the store 22 has been completed, and the word displaced from register 10 has been "written back" into the store 22, the pulse ws (FIG. 9r) will have passed through the delay line 37 (FIG. 2). The next operation is to "read out" the new word from the store 22. In preparation therefor, the pulse ws is thereupon applied to an input of "and" gate 61 (FIG. 2) which is enabled by high outputs $T_4$ of flip-flop T4 and $T_9'$ of flip-flop T9. The output of gate 61, pulse rs1, is applied to gate 59 (FIG. 3) to provide for the transfer of the address from the look-aside address register 10a to the A register (FIG. 3) to prepare for "reading-out" of the new word from the store 22 into the B register. Also, the pulse rs1 (FIG. 9y) is applied to: the input of the delay line 37 (FIG. 2) to initiate a "read" operating cycle in the store 22; the input $t_9$, via "or" gate 77, to set the flip-flop T9; and the reset inputs $_0b_1$–$_0b_{12}$ of flip-flops B1–B12 (FIG. 3) to reset all of the flip-flops B1–B12 in a clearing operation at the beginning of the "read" operating cycle of the store 22. The high output $T_9$ of flip-flop T9 enables "and" gate 68 to pass a strobe pulse sp to the sense amplifiers, e.g. sense amplifier 66 of the store 22, as illustrated in FIG. 2a.

At the end of the "read" operating cycle of the store 22, the addressed word has been "read-out" of the store 22 into the B register, and also "written back" into the addressed cell in the store 22. In order to transfer the word stored in the B register to the look-aside register 10, a "look-aside operating cycle to complete a store cycle" (FIG. 9) is required. It should be noted at this point that the look-aside operating cycles were not interrupted during the operating cycles of the store 22. In order to prevent a "read" or "write" operation in the look-aside unit 24 involving the L and M registers, when transferring the word from the B register to the look-aside register 10, the "and" gates 36 of the timing pulse source 30 (FIG. 2) are disabled by low logical potential levels (—10 v.) $T_4'$ and $T_8'$ at the inputs to "or" gate 36a. The pulses P1 to P7 are blocked, therefore, in a "look-aside operating cycle to complete a store cycle" as indicated in FIG. 9c. This special look-aside operating cycle is provided for by setting flip-flops T7 and T8. The pulse rs1, after passing through the delay line 37 is passed by "and" gate 62 to produce a pulse st (FIG. 9z) which is applied to set input $t_7$ to set flip-flop T7. The flip-flop T8 (FIG. 2) is set by pulse P7 passed by "and" gate 63 which is enabled by the high output $T_7$ (FIG. 9a').

The transfer of the word stored in the B register to the look-aside register 10 in the "look-aside operating cycle to complete a store cycle" is provided for by passing pulse Q5 (FIG. 9b) through "and" gate 58 (FIG. 4). This gate 58 is enabled by high outputs $T_4$ and $T_8$ (FIGS. 9v and 9b'). "And" gates 47 of the selected look-aside register 10 are enabled by the high output of gate 58 and the high output $R_{10}$ (FIG. 9l) to transfer the contents of the B register to the look-aside register 10.

Figure 7:
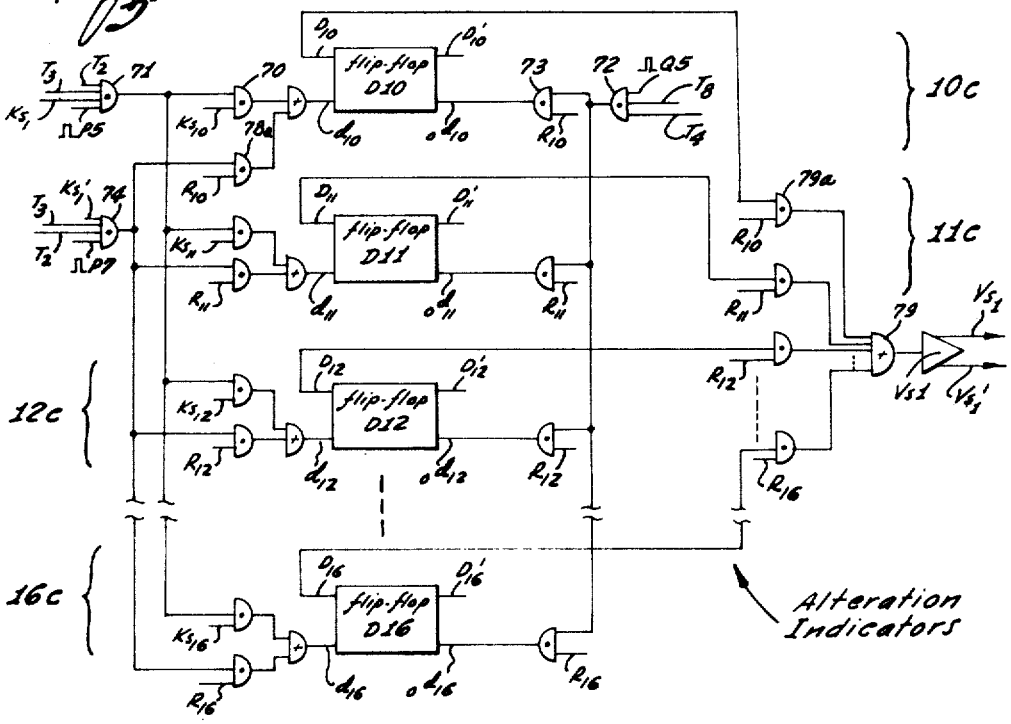
FIG. 7 is a schematic block diagram of a portion of the alteration indicators which provide indications of the alteration of data in corresponding information storage registers of the look-aside unit shown in FIG. 1.

In addition, timing pulse Q5 is passed by "and" gate 151 (FIG. 6), enabled by high outputs $T_4$ and $T_8$, and "and" gate 154, enabled by the high output $R_{10}$ to produce a charging pulse ep (FIG. 9k) for fully charging capacitor 110 in the analog indicator 10b. The charging of capacitor 110 produces an analog signal output in indicator 10b to indicate recent usage of the word in register 10. Also, timing pulse Q5 is gate by "and" gates 72 and 73 enabled by high outputs $T_4$, $T_8$, and $R_{10}$, respectively, to reset flip-flop D10 as shown in FIGS. 7 and 9m.

The next timing pulse Q7 (FIG. 9b) completes the "look-aside operating cycle to complete a store cycle" by resetting control flip-flops T4–T8 (FIG. 2). "And" gate 75 (FIG. 2) is enabled by the high outputs $T_4$ and $T_8$ to pass pulse Q7 through "or" gate 85 to provide a reset pulse (FIG. 9c') at the reset inputs $_0t_4$–$_0t_8$.

The foregoing description of a "read" operation in the memory 20 included the situation in which an altered word was displaced from register 10 to provide storage space therein. Because this word was altered, the output $D_{10}$ of the alteration indicator 10c (FIG. 7) was high to indicate that the "write" operating cycle in the store 22 is necessary. If this word had not been altered, a "write" operating cycle in the store 22 would not be necessary since the "write" operating cycle of the store 22 is necessary only to up-date a word in the store 22. Since there is no need for a "write" operating cycle when the word being displaced from look-aside register 10 has not been altered, the address of the new word is transferred from register 10a to the A register (FIG. 3) at the time of pulse P6 (FIG. 9c) to prepare for a "read" operating cycle in store 22. "And" gate 57 (FIG. 3) having an output pulse sa (FIG. 9t) provides for the transfer from look-aside register 10a to the A register at the time of pulse P6.

The "read" operating cycle in the store 22 is initiated under the foregoing conditions as shown in FIG. 2. An "and" gate 69 produces an output pulse rs2 which is coupled to the store delay line 37 through "or" gate 76 and to the set input $t_9$ of the flip-flop T9 through "or" gate 77. The pulse rs2 is coupled to the store delay line 37 to provide for the necessary outputs from the delay line to produce a "read" operating cycle of the store 22.

At the end of the "read" operating cycle of the store 22, when the pulse rs2 has passed through the entire delay line 37, the pulse rs2 is coupled to "and" gate 62 which has been enabled by high outputs $T_9$ and $T_4$. The remainder of the operations following the "read" operating cycle in the store 22 including the "look-aside operating cycle to complete a store cycle" are the same as described supra.

The operation of the memory 20 for "writing" therein, when an address is not stored in the look-aside registers 10a to 16a, is the next operation to be described. As in other look-aside cycles for "writing," the address of the new word is placed in the L register, the new word is placed in the M register, and the write-control flip-flop T2 is set. Since this portion of the description assumes the address of the new word is not in the look-aside registers 10a to 16a, the word having the least recent use is displaced. For clarity in explanation, it will be assumed again that look-aside register 10 contains the word having the least recent usage and is to be displaced to provide space for the new word which is to be "written" into the register 10. Thus, the analog usage indicator 10b will have a high output $R_{10}$ from flip-flop R10 (FIG. 6). If the word being displaced from register 10 has not been altered, a single look-aside operating cycle is sufficient to store the word and its address in the look-aside registers 10 and 10a, respectively. Since a look-aside operating cycle involving "writing" has already been described, i.e., when the word being accessed is stored in one of the look-aside registers, such as register 10, the description is not being repeated at this point. The reason for not "writing" an unaltered word back into the store 22, when being displaced from a look-aside register, is that the word is already stored in the cell of the store 22 at the proper address.

Continuing the description of the operation for "writing" into the memory 20 when the address of the word is not in the look-aside registers 10a to 16a, it will now be assumed that the word being displaced from register 10 has been altered. Because the word is altered, the alteration indicator driver Vs1 (FIGURE 7) will have an output Vs1 (FIG. 9o). Under these conditions, the word being displaced from register 10 must be "written-back" into the store 22. In order to produce a "write" operating cycle in the store 22, write-control flip-flop T5 (FIG. 2) is set by the high output of "and" gate 82 at the time of pulse P4 (FIG. 9) to enable "and" gate 38 provided at the input of delay line 37 to pass the timing pulse P6. The other opertions involved have been already described and include: transferring the contents of look-aside registers 10a and 10 to the A and B registers, respectively, at time of pulse P4; transferring the contents of the L and M registers to the look-aside registers 10a and 10, respectively, at the time of pulse P5; and initiating a "write" operating cycle only in the store 22 at the time of pulse P6.

Since the new word is stored in the look-aside register 10 at the end of the look-aside operating cycle (FIG. 9), a pulse X1 (FIG. 9s) is produced in the output of gate 33 at the time of pulse P7 (FIG. 9c) to indicate a complete look-aside operating cycle. Also, it is noted that the word stored in look-aside register 10 is available for access via the L register in the immediately following look-aside operating cycles even though an operating cycle of the store 22 is in progress. As shown in FIG. 5, the high output of "and" gate 50 is passed by "or" gate 51 to enable the "and" gate 52 upon an equal comparison of the address in the L register and look-aside register 10a in the immediately following look-aside cycles. The other inputs to "or" gate 51 would be low because output $R_{10}'$ is low and the output $T_5'$ to "and" gate 53 is low.

In the foregoing description of the operation of the memory 20, it was assumed that the store 22 was not already involved in one of its own operating cycles at the time a look-aside cycle was initiated. If an output $Ks_1$ is produced upon comparison of addresses in the comparator 25 (FIG. 5), the fact that the store 22 is busy is of no consequence and a complete look-aside operating cycle will result. If, however, a high output $Ks_1'$ is produced upon comparison of addresses in the comparator 25, the high outputs $T_6$ and $Ks_1'$ will enable "and" gate 67 (FIG. 2) to produce a pulse X3 (FIG. 9j) at the time of pulse P4 (FIG. 9c). The pulse X3 (FIG. 9j) is produced on the line 86 connected to the output of gate 67, as shown in FIG. 2. The pulse X3 is coupled to the processing unit 21 (C.P.U.) to indicate that the operation requested was not completed in that no access was provided to the word at the address placed in the L register. The output of the gate 67 is also coupled to the reset input ${}_0t_1$ to ${}_0t_3$ to reset flip-flops T1–T3 and thereby terminate the operations in the look-aside operating cycle and prepare for the following look-aside cycle.

Referring to FIG. 3 for a brief description of the memory address registers shown therein, it should be noted that the first and last look-aside address storage registers, namely the F register 10a and the H register 16a have been shown schematically. Also, the A address register, the address register for the main store 22, and the L address register, the address register for memory 20, have been shown. These registers, as shown in FIG. 3, provide an understanding of the transfer and storage of addresses in the operation of the memory 20. The outputs $R_{10}$ and $R_{16}$ from flip-flops R10 and R16 (FIG. 6) of the analog indicators 10b and 16b, respectively, are shown coupled to "and" gates in the inputs and outputs of flip-flops F1–F12 and flip-flops H1–H12 of the look-aside registers 10a and 16a, respectively. These "and" gates and similar "and" gates are provided for each of the registers 10a to 16a to provide for selectively transferring the contents of the L register to one of the address registers 10a to 16a and selectively transferring the contents of one of the address registers 10a to 16a to the A register. These transfers of addresses occur in the operation of the memory 20 when a word is being displaced in the look-aside registers 10 to 16 and a new word is being stored therein as set forth in the prior description of the operation of the memory 20, i.e. when the address placed in the L register is not stored in any of the look-aside registers 10 to 16.

FIG. 4 shows the memory information registers having corresponding address registers shown in FIG. 3. The B register, the buffer register for the main store 22, stores the word whose address is in the A register (FIG. 3). The M register, the buffer register for the memory 20, stores the word whose address is in the L register. The look-aside information storage registers 10 and 16 (G and J register) are provided to store the words whose addresses are stored in the address storage registers 10a and 16a (F and H registers, FIG. 3), respectively. As set forth in the description of the operation of the memory 20, the registers shown in FIG. 4 provide for the transfer of information during look-aside operating cycles and operating cycles of the store 22.

The comparator 25 is shown in FIG. 5 in such detail as is necessary for an understanding of its operation. Thus, the only connections to the comparator 25 that are shown, are those for flip-flops of the look-aside register 10a and L register which are also shown. The outputs of the flip-flops of the F register 10a and L register are connected as shown to provide a comparison of addresses stored therein. Similar logical circuitry is provided for each of the other look-aside address registers 11a to 16a (not shown in FIG. 5) whereby a comparison is made of the address in the L register and each of the addresses in the look-aside address registers 10a to 16a. Referring to the logical circuitry of the comparator 25, shown in FIG. 5, upon comparison of like addresses in the L register and the register 10a, each "or" gate 57a will have a high logical potential level (Ov) output which is coupled to "and" gate 52. This gate 52 is enabled by a high output (Ov) from "or" gate 51. Gate 51 has inputs from "and" gates 50 and 53 and an input $R_{10}'$. The enabling output for gate 52 from "or" gate 51 specifies that the word of information in the register 10 is valid information. The absence of this enabling input specifies that the information in the register 10 is invalid and that the addressed word is in the process of being accessed from the main store 22. The output of gate 52 is coupled to a driver Ks10 having a true output $Ks_{10}$ and a false output $Ks_{10}'$; this output of gate 52 is also coupled to "or" gate 54. A true output $Ks_{10}$ specifies that the address contained in the L register is in the register 10a and the word in the register 10 is valid. "Or" gate 54 has inputs from other "and" gates 52 (not shown) for each of the other look-aside address registers 11a to 16a. Thus, a high output from "or" gate 54 specifies that the address of the word to be accessed (the address in the L register) is in one of the look-aside address registers 10a to 16a. The output of the "or" gate 54 is coupled to the driver Ks1 having a true output $Ks_1$ and a false output $Ks_1'$. Thus, a true output $Ks_1$ specifies that the addressed word to be accessed is in one of the look-aside registers 10 to 16 and is a valid word; and a false output $Ks_1'$ specifies that the addressed word to be accessed is not in any of the look-aside registers 10 to 16.

Referring now to FIG. 6 for a detailed description of the analog usage indicators 10b to 16b, there are shown in detail therein, indicators 10b, 11b, 12b, and 16b which are sufficient to provide an understanding of the operation of the indicators 10b to 16b of the present invention. Considering the indicator 10b, it is shown to include an analog circuit having a capacitor 110 which stores a voltage that is a function of the usage of the associated look-aside register 10. The capacitor 110 is fully charged whenever the information in look-aside register 10 is accessed for "reading" or "writing" and is allowed to discharge slowly through resistor 120 at all other times. Each of the indicators 11b to 16b includes a capacitor, e.g., capacitors 111, 112 . . . 116, and a resistor, e.g., resistors 121, 122 . . . 126 which are connected to operate in the same manner in respective analog circuits of indicators 11b, 12b . . . 16b as capacitor 110 and resistor 120.

The voltages on the capacitors 110 to 116 are applied to the inputs of a comparison circuit that indicates one and only one of the indicators 10b to 16b whose capacitor has one of the lowest stored charges. This output is used to set the respective one of the flip-flops R10–R16 so that, if necessary, the memory control unit 28 can operate to displace the information in a designated one of the registers 10 to 16 which has the least recent usage.

The operations of the memory 20 that effect the charging of capacitor 110 are: "read" or "write" operations in the look-aside register 10 (FIG. 1). Each one of the foregoing operations produces a charging pulse ep that is applied to the base of transistor 100 to fully charge the capacitor 110. Gates 151 to 156 for indicator 10b, for example, are connected as shown to produce the charging pulse ep when any "read" or "write" operation is performed in the register 10. When capacitor 110 is not being charged by a pulse ep, it is being slowly discharged by resistor 120.

A comparison circuit is provided for the analog usage indicators 10b to 16b which is common to all of the indicators 10b to 16b and includes transistors 130, 131, 132 . . . 136, transistors 140, 141, 142 . . . 146, and Schmitt trigger circuits 160, 161, 162 . . . 166. These Schmitt trigger circuits change the voltage levels at the collectors of transistors 130 to 136 to digital voltage levels.

The bases of transistors 130, 131, 132 . . . 136 are connected to capacitors 110, 111, 112 . . . 116 respectively, as shown. The emitters of these transistors are connected to a common current source consisting of resistor 157 and the +75 volt source. With this circuit configuration, a resulting common emitter voltage is produced which approaches the voltage of one of these capacitors which has the most negative voltage. The most negative voltage on one of these capacitors of indicators 10b to 16b results from the least recent charging by pulse ep and indicates the least recent usage of the respective one of the look-aside registers 10 to 16. The transistor, of transistors 130 to 136, which is connected to the capacitor having the most negative voltage will always conduct. Some of the remaining transistors, of the transistors 130 to 136, will be "back biased" and will not conduct if the voltage on the respective capacitors is much more positive than the capacitor that has the most negative voltage. If the voltage on some of the capacitors 110 to 116 is more positive but near the most negative voltage of one of the capacitors, the respective transistors connected thereto will conduct some current but less than the one of the transistors 130 and 136 that has the most negative voltage connected to its base from its respective capacitor. The parameters of this circuit for transistors 130 to 136 are chosen so that if all of the capacitors 110 to 116 have the same voltage, all of these transistors conduct and the voltage drop across each of their collector resistors is large enough to turn on the Schmitt trigger circuits 160 to 166. To summarize, the voltage drop across the collector resistors of only the transistors 130 to 136 whose base voltage is very near the most negative will be sufficient to turn on the respective Schmitt trigger circuits connected to them, but if all of the base voltages are very near the same, all the Schmidt trigger circuits will be turned on.

If only one Schmitt trigger circuit is turned on, it is clear that the associated one of the registers 10 to 16 has had the least recent usage; but since a number of Schmitt triggers may be on at the same time, only one of registers 10 to 16 must be selected by setting one of the flip-flops R10–R16. If more than one of these registers 10 to 16 have had almost the same usage, very little is to be gained by attempting to choose the particular register from among these, that has the least recent usage. Therefore, the lowest order indicator of indicators 10b to 16b, having a Schmitt trigger turned on, is selected. This is accomplished by the circuit including transistors 140, 141, 142 . . . 146. This circuit is, what is often referred to as, a "resistor-transistor 'nor' logical circuit" and provides interconnections so that one of the transistors 140 to 146, which is not conducting, forces the remaining of these transistors of a higher order number to conduct. In order to provide high level logical potentials (Ov) from the selected one of the non-conducting transistors 140 to 146, they are connected to the false outputs 160a to 166a respectively, of the Schmitt trigger circuits.

The outputs of transistors 140 to 146 are connected to "and" gates 170 to 176 respectively. A high output (Ov) from transistor 140 for example, enables "and" gate 170 to pass a high output pulse (Ov) from "and" gate 177 to set input $r_{10}$ of flip-flop R10. The flip-flop R10 provides a high output $R_{10}$ which indicates that the word in look-aside register 10 is one of the registers that has had the least recent usage and is the word to be displaced when storage space is needed for another word in the look-aside registers 10 to 16. The flip-flop R10 is reset early in a look-aside cycle if the main store is not busy by the high output pulse (Ov) of "and" gate 178 at the time of pulse P2. In this manner, the flip-flops R10–R16 provide a current digital indication of the state of the analog circuits of indicators 10b to 16b.

In FIG. 7, the alteration indicators 10c, 11c, 12c and 16c are shown to illustrate their operation which is typical for all of the alteration indicators 10c to 16c. "And" gates 71 and 74 are common to all alteration indicators 10c to 16c. A high output pulse (Ov) from either gate 71 or 74 specifies that a word is being "written" into one of the registers 10 to 16. "And" gates 70 or 78a, for example, specify that the word is being "written" into register 10. A high output pulse from either gate 70 or 71 is coupled to the input $d_{10}$ to set flip-flop D10. A high output $D_{10}$, for example, indicates that the word in register 10 has been altered and must be "written-back" into the store 22 when being displaced from the look-aside register 10. The high output $D_{10}$ is coupled to "and" gate 79a having an enabling input $R_{10}$, for example, from the flip-flop R10 of analog usage indicator 10b. The output of "and" gate 79a is coupled to "or" gate 79 which provides a high input (Ov) to driver Vs1. A true output $Vs_1$ of the driver Vs1 specifies that the word which is displaced from register 10 has been altered and must be "written-back" into the store 22.

Figure 2B:
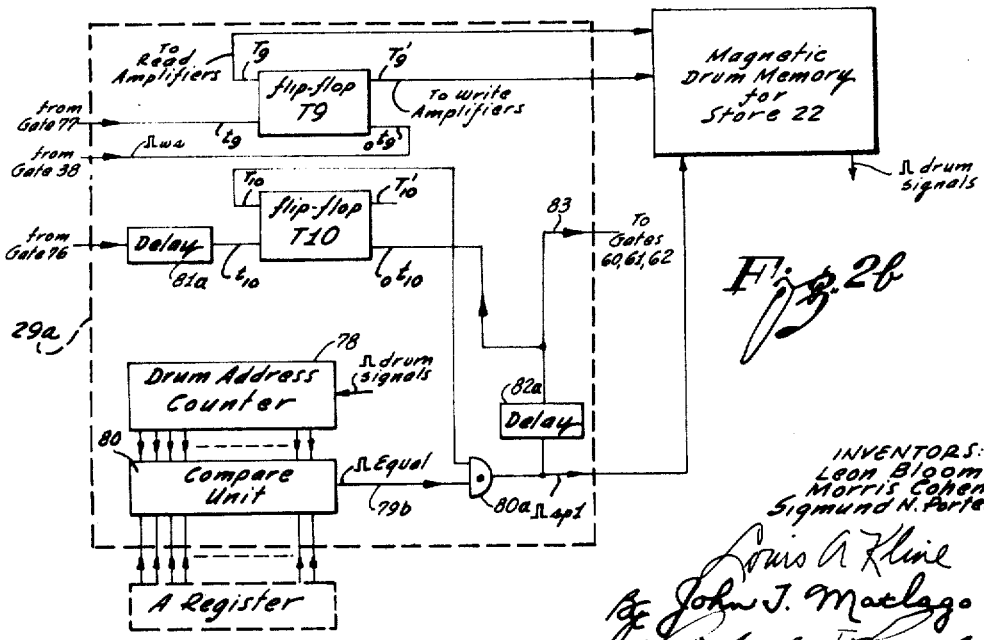
FIG. 2b is a schematic diagram of an alternate timing control and a magnetic drum memory providing an alternate embodiment of the main information store, shown in FIG. 1.

Referring now to FIG. 2b, an alternate timing control circuit 29a and magnetic drum memory for store 22 is shown. This timing control 29a is provided in the memory control unit 28 (FIG. 1) instead of the timing control 29 (FIG. 2) when the store 22 comprises a magnetic drum memory instead of a magnetic core storage as shown in FIGS. 1 and 2a. As is known, conventional magnetic drum memories include a set of read-write heads (not shown) for "reading" and "writing" words of information on the surface of a drum of a magnetic drum memory, and separate amplifiers (not shown) for amplifying the pulses to respective read-write heads of the set. The outputs of the amplifiers are individually gated for "reading" or "writing" operations. The timing control 29a (FIG. 2b) provides a timing control flip-flop T9 having an output $T_9$ for gating the output of these read amplifiers for a "read" operating cycle of the magnetic drum memory and an output $T_9'$ for gating the output of the write amplifiers for a "write" operating cycle of the magnetic drum memory. The flip-flop T9 is triggered by the outputs of gates 77 or 38 (FIG. 2) to gate the read or the write amplifiers, respectively. In addition, a timing control flip-flop T10 is triggered by the output of gate 76 (FIG. 2) which is delayed in time by delay 81a to allow time for setting or resetting of flip-flop T9, in response to the output of gate 77 or gate 38, before setting flip-flop T10. The output $T_{10}$ enables "and" gate 80a to pass the output of a compare unit 80 on output line 79b as shown in FIG. 2b.

A drum address counter 78 and a compare unit 80 are used in the customary manner, i.e., the counter is stepped by drum pulses reproduced by a read head disposed over a timing track on the drum surface (not shown) so that the contents of the counter 78 is the address of the word passing by the aforementioned read-write heads. When the proper enabling signals are supplied by flip-flop T9, as described above, no read or write operation takes place until the contents of the drum address counter 78 is equal to the contents of the address register A. When the contents of the counter equals the contents of the register, the compare unit 80 produces an "equal" output pulse which is passed by "and" gate 80a to initiate a strobe pulse sp1 to the read amplifiers for "reading" the word on the drum at the address stored in the A register and to the write amplifiers for "writing" in a word at the address stored in the A register. Also, the output of gate 80a is coupled through a time delay 82a to output line 83 to gates 60, 61, and 62 (FIG. 2), and to the reset input $_0t_{10}$ to reset flip-flop T10 for the next operating cycle of the magnetic drum memory. The time delay 82a provides a delay in time to provide for "reading" or "writing" before resetting flip-flop T10.

In the light of the above teachings, various modifications and variations of the present invention are contemplated and will be apparent to those skilled in the art without departing from the spirit and scope of the present invention.

What is claimed is:

1. A memory arrangement for a data processing system comprising: a main store providing a random access to words of information stored therein; a memory providing a faster access to words of information stored therein than provided by said main store, said memory comprising a plurality of registers for storing words of information and providing random access thereto for current use in said system; analog indicator means coupled to said registers, said analog indicator means including means coupled to said registers and responsive to the accessing of information therefrom for indicating a register which has had the least recent usage; and logical circuit means coupled to said indicator means for displacing words of information in said registers which have had the least recent usage to provide storage space for new words stored in the main store.

2. A memory arrangement for a data processing system comprising: a main information store having a relatively large capacity for storing words of information for executing programs in said data processing system; means including main store address and information registers for providing access to words of information in said main store; a small capacity, fast-access memory providing rapid access to words of information stored therein, said small memory comprising a set of registers for storing words of information which are being accessed currently in the execution of programs in said data processing system; means *including memory address and information registers* coupled to said fast-access memory for accessing all words of information stored in said memory arrangement including [memory address and information registers] *both said fast-access memory and said main store*; and control means for said memory arrangement including means for selectively controlling displacements of individual words of information in said set of registers of said fast-access memory and replacing said displaced words in said set of registers by other words of information having addresses in said main store.

3. A memory arrangement for a data processing system comprising: a main information store having a relatively large capacity for storing words of information; means including main store address and information registers for accessing words of information in said main store; a small capacity, fast-access memory providing rapid access to words of information stored therein, said small memory comprising a plurality of sets of address and information storage registers for storing words of information which are currently being accessed and their respective addresses, means *including memory address and information registers* coupled to said fast-access memory for accessing all words of information stored in said memory arrangement including [memory address and information registers] *both said fast-access memory and said main store*; and control means for said memory arrangement including means for selectively controlling displacement of individual words of information in said sets of registers of said fast-access memory and replacing said displaced words in said sets of registers by other words of information currently being accessed and their respective addresses.

4. A memory arrangement for a data processing system comprising: a main information store having a relatively large capacity for storing words of information; means including main store address and information registers for accessing words of information in said main store; a small capacity, fast-access memory, said small memory comprising a set of cells for storing words of information which are currently being accessed; means coupled to said fast-access memory for accessing words of information stored in said memory arrangement including memory address and information registers; control means for said memory arrangement including means for selectively controlling displacement of individual words of information in said fast-access memory and replacing said displaced words by other words of information being accessed; and analog indicator means for said set of cells for indicating recent access to words of information stored therein including means coupled to said control means for designating at least one of the words of information to be displaced which has had the least recent access thereto.

5. A memory arrangement for a digital data processing system comprising: a processing unit for processing digital information; a main store providing magnetic storage of words of information and random access thereto within the time period of an operating cycle of the main store including reading-out and writing-back a word of information being accessed from said main store; a small capacity, fast-access memory unit for storing a limited number of *each of the* words of information *accessed from the main store including index words and words of data* and their addresses in multiple sets of address and information storage registers to provide random access to words stored therein for said processing unit within a shorter time period of a cycle of said memory unit; control circuit means coupled to said main store and memory unit for controlling the transfer of *each of the* words of information *accessed from the main store* between the main store and the memory unit; and alteration indicator means coupled to said memory unit and to said control circuit means, said indicator means being responsive to alteration of a word stored in the memory unit to provide an output to the control circuit means which enables said latter means to transfer altered words from the memory unit for storage in said main store.

*6. The memory arrangement in accordance with claim 3 in which said memory address and information registers for said fast-access memory comprise the input-output registers for said memory arrangement and comprise the only means of access to word storage locations of said memory arrangement.*

*7. The memory arrangement in accordance with claim 3 in which word storage locations of said main store are accessible only through said fast-access memory.*

*8. The memory arrangement in accordance with claim 3 in which said control means is coupled to said small capacity, fast-access memory and selective displacement of the word of information stored in a word storage location of said fast-access memory is determined by least recent access to the set of registers comprising the word storage location for said word of information.*

*9. The memory arrangement in accordance with claim 3 in which access to any word storage location in said memory arrangement is provided only by said memory address and information registers coupled to said fast-access memory, and said control means is constructed and arranged to provide access to any selected word of information not currently stored in said fast-access memory and stored in said main store by transfer of the address of the selected word storage location to one of said address storage registers of said fast-access memory and accessing the selected word storage location in said main store.*

*10. The memory arrangement in accordance with claim 9 in which said control means further provides for transfer of said address of the word location to said main store address register from said address storage register of the fast-access memory.*

*11. The memory arrangement in accordance with claim 9 in which said control means includes word transfer means coupled to said plurality of sets of storage registers to provide for transfer of information in any selected one of said sets of storage registers to said main store registers.*

*12. The memory arrangement in accordance with claim 11 in which said word transfer means provides for automatically restoring words of information to said main store which are displaced from said plurality of sets of storage registers prior to said transfer from said memory register and thereafter accessing said selected word location in said main memory and storage in said selected one of said sets of storage registers of said fast-access memory.*

References Cited

The following references, cited by the Examiner, are of record in the patented file of this patent or the original patent.

UNITED STATES PATENTS

| | | |
|---|---|---|
| 3,238,510 | 3/1966 | Ergott. |
| 2,960,683 | 11/1960 | Gregory et al. |
| 2,984,831 | 5/1961 | Oken et al. |
| 2,919,431 | 12/1959 | Blackford. |
| 2,870,436 | 1/1959 | Kuder. |

GARETH D. SHAW, *Primary Examiner.*